United States Patent
Ma et al.

(10) Patent No.: US 12,128,565 B2
(45) Date of Patent: Oct. 29, 2024

(54) DUAL-MAINPULATOR CONTROL METHOD AND STORAGE MEDIUM

(71) Applicant: Suzhou Engoal Intelligent Technologies Co., Ltd, Suzhou (CN)

(72) Inventors: Zhanpeng Ma, Suzhou (CN); He Wang, Suzhou (CN); Hong Qian, Suzhou (CN)

(73) Assignee: Suzhou Engoal Intelligent Technologies Co., LTD, Suzhou (CN)

( * ) Notice: Subject to any disclaimer, the term of this patent is extended or adjusted under 35 U.S.C. 154(b) by 292 days.

(21) Appl. No.: 17/750,379

(22) Filed: May 22, 2022

(65) Prior Publication Data

US 2023/0125934 A1    Apr. 27, 2023

(30) Foreign Application Priority Data

Oct. 27, 2021  (CN) .......................... 202111257604.0

(51) Int. Cl.
  *G06F 17/00* (2019.01)
  *B25J 9/00* (2006.01)
  *B25J 9/16* (2006.01)

(52) U.S. Cl.
  CPC ........... *B25J 9/1661* (2013.01); *B25J 9/0087* (2013.01); *B25J 9/1689* (2013.01)

(58) Field of Classification Search
  CPC ...... B25J 9/1661; B25J 9/0087; B25J 9/1689; B25J 9/1669; B25J 9/1682; B25J 9/1602;
  (Continued)

(56) References Cited

U.S. PATENT DOCUMENTS 5,254,923 A * 10/1993 Kanitani .................. B25J 9/009
                                                                901/1
5,889,924 A *  3/1999 Okabayashi ........... B25J 9/1682
                                                                700/245
(Continued)

FOREIGN PATENT DOCUMENTS

CN        102721746 A      10/2012
CN        104476550 A       4/2015
(Continued)

OTHER PUBLICATIONS

Adaptive and intelligent control of a dual-arm space robot for target manipulation during the post-capture phase (Year: 2023).*
(Continued)

*Primary Examiner* — Ronnie M Mancho

(57) ABSTRACT

A dual-manipulator control method is configured to be used in a dual-manipulator control system including a first manipulator, a second manipulator, and a central control module. The first manipulator and the second manipulator are controlled by the central control module, and the central control module is configured to execute the dual-manipulator control method. The dual-manipulator control method includes: generating a first instruction sequence to control the first manipulator and a second instruction sequence to control the second manipulator; and controlling the first manipulator and the second manipulator based on the first instruction sequence and the second instruction sequence. Thus, the working efficiency is improved.

20 Claims, 4 Drawing Sheets

(58) Field of Classification Search
CPC . B25J 9/161; B25J 13/00; B25J 13/08; G05B 2219/37567; G05B 2219/39117; G05B 2219/39135; G05B 2219/40014; G05B 2219/40007; G05B 2219/40307; G05B 2219/40532; Y02P 90/02
USPC .......................................................... 700/248
See application file for complete search history.

(56) References Cited

U.S. PATENT DOCUMENTS

| | | | | |
|---|---|---|---|---|
| 6,897,626 | B2* | 5/2005 | Fujibayashi | G05B 19/4103 |
| | | | | 318/567 |
| 7,211,978 | B2* | 5/2007 | Chang | B25J 9/1669 |
| | | | | 901/41 |
| 9,086,694 | B2* | 7/2015 | Ha | G05B 19/4141 |
| 9,579,797 | B2* | 2/2017 | Apkarian | B25J 9/1689 |
| 9,895,807 | B2* | 2/2018 | Wiedemann | B25J 9/1682 |
| 10,667,871 | B2* | 6/2020 | Romo | A61B 10/04 |
| 11,259,870 | B2* | 3/2022 | DiMaio | A61B 34/71 |
| 2002/0066330 | A1 | 6/2002 | Namba et al. | |
| 2013/0018485 | A1 | 1/2013 | Stoddard | |
| 2019/0126482 | A1 | 5/2019 | Tomita | |
| 2020/0206907 | A1 | 7/2020 | Zhou et al. | |
| 2021/0053230 | A1 | 2/2021 | Mizoguchi et al. | |
| 2021/0122586 | A1 | 4/2021 | Sun et al. | |
| 2021/0237990 | A1 | 8/2021 | Morency et al. | |

FOREIGN PATENT DOCUMENTS

| | | | | |
|---|---|---|---|---|
| CN | 105382831 A | | 3/2016 | |
| CN | 105751199 A | | 7/2016 | |
| CN | 107972026 A | | 5/2018 | |
| CN | 113493083 A | | 10/2021 | |
| CN | 109788994 B | * | 7/2022 | ............ A61B 34/30 |
| DE | 3932013 A1 | | 5/1990 | |
| DE | 10235943 A1 | * | 2/2004 | ............ B25J 9/1669 |
| DE | 102004021388 A1 | * | 12/2005 | ............ B25J 9/009 |
| EP | 1705541 A3 | * | 8/2008 | ............ B25J 9/1669 |
| EP | 2589469 A1 | | 5/2015 | |
| EP | 2998082 A1 | | 3/2016 | |
| JP | 2020116421 A | * | 8/2020 | ............ A61B 10/04 |
| WO | WO-03039817 A1 | * | 5/2003 | ............ B25J 9/1682 |
| WO | WO-2017129360 A1 | * | 8/2017 | ............ B25J 9/1669 |

OTHER PUBLICATIONS

Wu Weiguo, Xu Fenglin, "Design and sim ulation analysis ofa dualarm & hands m obile robotused In space truss", Machinery Design & Manufacture, Mar. 8, 2007, p. 110-112.

Wang Meiling, "Research on Cooperative Motion Planing and Control of a Redundant Dual-arm Robot for Rescuing Task", University of Science and Technology of China, Jun. 15, 2016, 1140-83.

Qi Hui, Li Bing-qiang, Guan Rui-qing, "Design of control system for the hot-line operate robot sample production", Mar. 30, 2007, vol. 29, Issue 3.

* cited by examiner

DUAL-MAINPULATOR CONTROL METHOD AND STORAGE MEDIUM

RELATED APPLICATIONS

This application claims the benefit of priority of Chinse application No. 202111257604.0, filed on Oct. 27, 2021, and the content of which is incorporated herein by reference in its entirety.

TECHNICAL FIELD

The present disclosure relates to the field of intelligent devices, in particular to a dual-manipulator control method, a central control module, a dual-manipulator system and a storage medium.

BACKGROUND

With the development of science and technology, it has become a major trend that human labors are replaced by intelligent devices to save labor costs and realize automatic transportation. However, the work efficiency of a single intelligent device is relatively lower than that of multi-intelligent devices. So how to make multi-intelligent devices work together and effectively has become a new issue.

SUMMARY

In order to resolve at least one of above technical problems, in a first aspect of the present disclosure, a dual-manipulator control method for a dual-manipulator system is provided. In some exemplary embodiments of the present disclosure, the dual-manipulator control method includes: generating, by a central control module of the dual-manipulator system, a first instruction sequence including at least one instruction to control a first manipulator of the dual-manipulator system; generating, by the central control module, a second instruction sequence including at least one instruction to control a second manipulator of the dual-manipulator system; and controlling, by the central control module, the first manipulator and the second manipulator based on the first instruction sequence and the second instruction sequence.

In a second aspect of the present disclosure, a dual-manipulator control system is provided. In some exemplary embodiments of the present disclosure, the dual-manipulator control system includes a first manipulator; a second manipulator; and a central control module, configured to: generate a first instruction sequence including at least one instruction to control the first manipulator, generate a second instruction sequence including at least one instruction to control the second manipulator, and control the first manipulator and the second manipulator based on the first instruction sequence and the second instruction sequence.

In a third aspect of the present disclosure, a non-transitory computer-readable storage medium is provided. In some exemplary embodiments of the present disclosure, the non-transitory computer-readable storage medium includes a set of instructions for dual-manipulator control, wherein when executed by at least one processor, the set of instruction directs the at least one processor to perform: generating a first instruction sequence including at least one instruction to control a first manipulator, generating a second instruction sequence including at least one instruction to control a second manipulator, and controlling the first manipulator and the second manipulator based on the first instruction sequence and the second instruction sequence.

It should be understood that the above general description and the following detailed description are merely exemplary and explanatory, and are not limits to the present disclosure.

Other features and aspects of the present disclosure will become clear based on the following detailed description of exemplary embodiments with reference to the accompanying drawings.

BRIEF DESCRIPTION OF THE DRAWINGS

To clearly illustrate some exemplary embodiments of the present disclosure, the following will briefly introduce the drawings for the description of some exemplary embodiments. Obviously, the drawings in the following description are merely some exemplary embodiments of the present disclosure, and other drawings may also be obtained according to these drawings without exerting inventive efforts by those of ordinary skill in the art.

DETAILED DESCRIPTION

Figure 1:
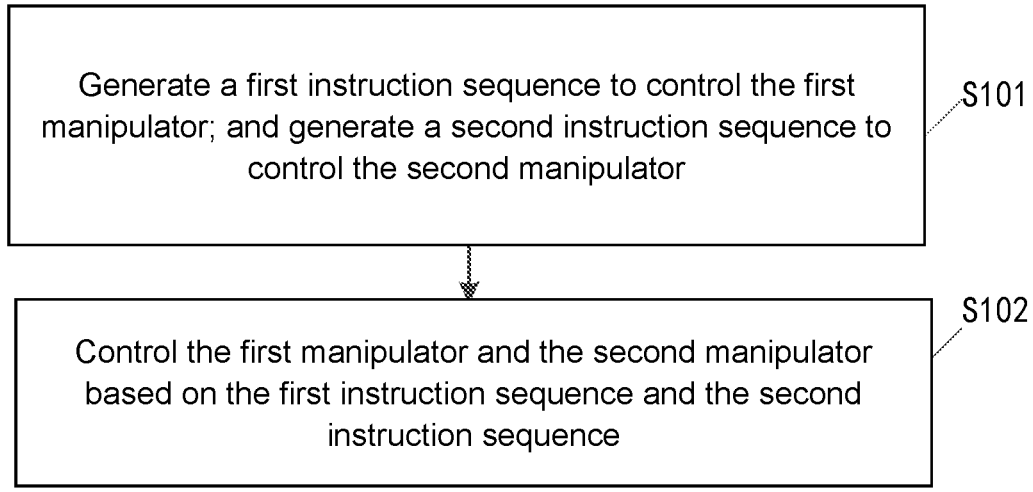
FIG. 1 schematically shows a flowchart of a dual-manipulator control method according to some exemplary embodiments of the present disclosure.

The technical solutions in some exemplary embodiments of the present disclosure will be described with reference to the accompanying drawings. Obviously, the described embodiments are only a part of the embodiments of the present disclosure, rather than all of the embodiments thereof. Based on these exemplary embodiments of the present disclosure, all other embodiments obtained by those of ordinary skilled in the art without exerting inventive efforts fall within the scope of protection of the present disclosure.

It should be noted that the terms "first", "second" and the like in the description and claims as well as the above drawings of the present disclosure are used to distinguish similar objects and are not necessarily used to describe a specific order or sequence. It should be understood that the data thus used may be interchanged under appropriate circumstances, so that the exemplary embodiments of the present disclosure described herein may be implemented in an order other than those illustrated or described herein. In addition, the terms "include" "comprise" and "have" and any variations of them are intended to cover non-exclusive inclusion, for example, processes, methods, systems, module, products, or servers that include a series of steps or units. These terms may not be limited to those explicitly listed, but may include other steps or units that are not explicitly listed or inherent to such processes, methods, products, or devices.

Various exemplary embodiments, features and aspects of the present disclosure will be described in detail below with reference to the accompanying drawings. Like reference numerals in the drawings denote elements with identical or similar functions. Although various aspects of the exemplary embodiments are shown in the drawings, it is not necessary to draw the drawings to scale unless specifically noted.

The word "exemplary" as used herein means "serving as an example, embodiment, or illustration". Any embodiment illustrated herein as "exemplary" may not be construed as preferred or advantageous over other embodiments.

In the present disclosure, the term "and/or" is simply a description of an association relationship of the associated objects, indicating that three relationships may exist, for example, A and/or B, which may mean: A exists alone, both A and B exist, and B exists alone. In addition, the term "at least one" used herein means any one or any combination of at least two of the plurality, for example, including at least one of A, B, C may mean including any one or more elements selected from a set composed of A, B, and C.

In addition, in order to better illustrate the present disclosure, numerous specific details are given in the detailed description below. It is understood by those skilled in the art that the present disclosure may be practiced without certain specific details. In some examples, methods, means, elements and circuits well known to those skilled in the art are not described in detail in order to highlight the subject matter of the present disclosure.

Figure 7:
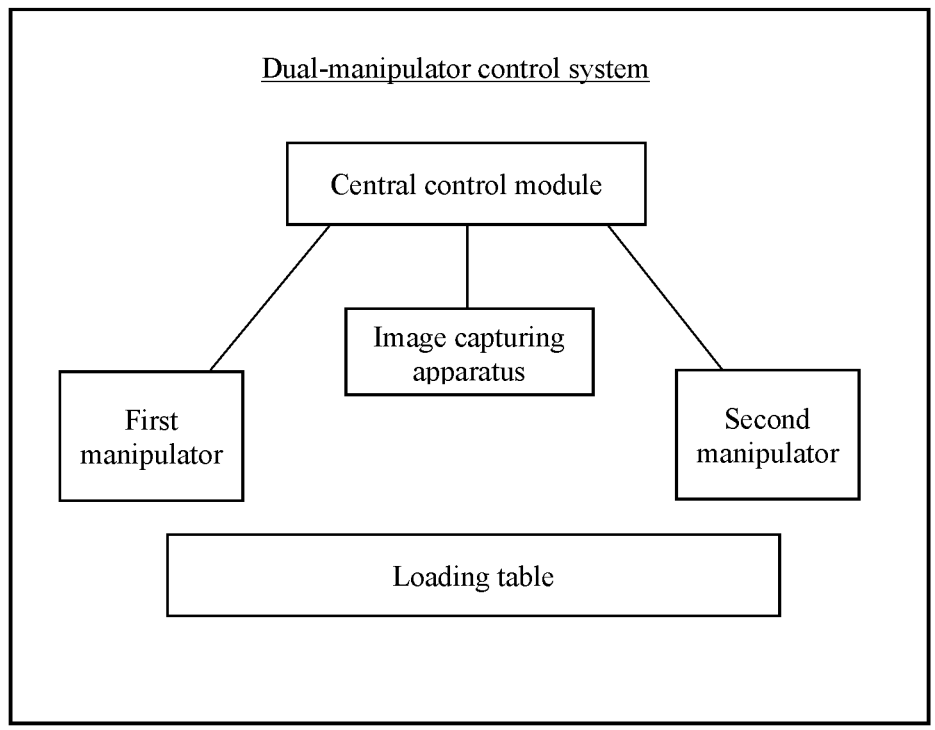
FIG. 7 schematically shows a structure of a dual-manipulator control system according to some exemplary embodiments of the present disclosure.
Figure 8:
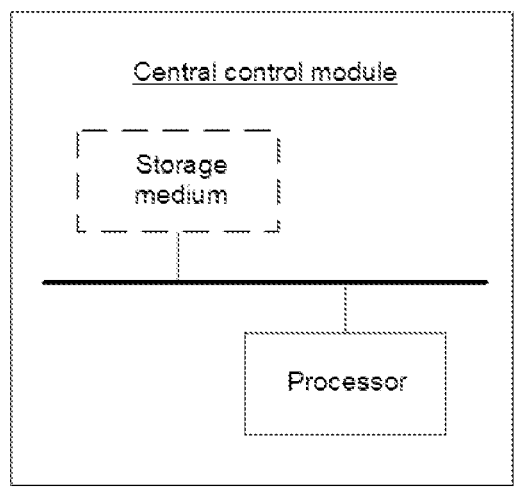
FIG. 8 schematically shows a structure of a central control module according to some exemplary embodiments of the present disclosure.

In some exemplary embodiments, a dual-manipulator control method is provided. The control method is configured to be used in a dual-manipulator control system, and the dual-manipulator control system may include: a first manipulator 20, a second manipulator 40, a loading table 30, an image capturing apparatus 50 and a central control module 10 (as shown in FIG. 7). The first manipulator and the second manipulator may be arranged at opposing sides of the loading table, and figured to grasp objects on the loading table and transfer them to a pre-set position(s). The image capturing apparatus, which is located atop the loading table, may be configured to shoot a number of objects stacked on the top of the loading table to obtain image and transfer the first image to the central control module. The central control module may include at least one storage medium and at least one processor (as shown in FIG. 8). The at least one storage medium stores a set of instructions for performing the dual-manipulator control methods illustrated in the following contents of this disclosure. The at least one processor is in communication with the at least one storage medium, wherein during operation, the at least one processor may execute the set of instructions to execute steps in the dual-manipulator control methods illustrated in the present disclosure.

The at least one storage medium may be a mass memory, a removable memory, a volatile read-write memory, a read-only memory (ROM), or the like, or any combination thereof. Exemplary mass memories may include non-transitory storage media, such as magnetic disks, optical discs, and solid-state drives. Removable memories may include flash drives, floppy disks, optical discs, memory cards, zip magnetic disks, magnetic tapes, and the like. A typical volatile read-write memory may include a random access memory (RAM). The RAM may include a dynamic RAM (DRAM), a double data rate synchronous dynamic RAM (DDR SDRAM), a static RAM (SRAM), a thyristor RAM (T-RAM), a zero-capacitance RAM (Z-RAM), or the like. The ROM may include a mask ROM (MROM), a programmable ROM (PROM), a programmable erasable (PEROM), an electronic programmable ROM (EEPROM), an optical disc (CD-ROM), a digital versatile disc ROM, or the like. In some exemplary embodiments, the storage medium 120 may be a cloud platform. As an example, the cloud platform may include a private cloud, a public cloud, a hybrid cloud, a community cloud, a distributed cloud, an inter-cloud cloud, or the like, or any combination of the foregoing forms.

The at least one processor may include one or more hardware processors, for example, a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), another type of circuit or processor that can perform one or more functions, and the like, or any combination thereof.

When there are objects placed (e.g., stacked) on the loading table, workers may issue a starting instruction to the central control module to move the loading table to a first position, and adjust the image capturing apparatus to a position where a top view of the objects falls a center of the image capturing apparatus's shooting range. Next, the image capturing apparatus is triggered to shoot a first image and then send the first image to the central control module. According to an analysis result of the first image, the central control module executes a control method, which is schematically shown in FIG. 1, so as to control the first manipulator and the second manipulator to grasp and move objects on a top layer of the objects on the loading table.

S101. Generate a first instruction sequence to control the first manipulator; and generate a second instruction sequence to control the second manipulator.

Specifically, the objects captured in the first image is identified, and their position information on a horizontal plane (which may be referred to as the horizontal position information) is obtained. Based on the horizontal position information of each object, depth information corresponding to each object may be extracted from the first image. For example, in some exemplary embodiments, a 3D vision camera is used as the image capturing apparatus. Based on the principle of binocular vision distance measurement, the depth information may be obtained by calculating the parallax between the left and right images.

The position information on a vertical plane of each object (which may be referred to the vertical position information) is obtained based on the depth information and the vertical position of the image capturing apparatus. Next, the first instruction sequence and the second instruction sequence may be generated according to the horizontal position information and the vertical position information of each object.

Instructions in the first instruction sequence may be used to control the first manipulator to grasp and move objects captured in the first image to the pre-set position; instructions in the second instruction sequence may be used to control the second manipulator to grasp and move objects captured in the first image to the pre-set position.

The way how the central control module obtaining the position information in the vertical direction of each object captured in the first image will not be described herein, and reference may be made to related technologies.

The horizontal position information of each object captured in the first image may be obtained by identifying boundary information of the corresponding object. However, the accuracy of object boundary identification may not be desirable, which may affect the quality of the boundary information, thus affecting the accuracy of the final instruction(s) (such as path planning). So a new neural network is designed and trained in some exemplary embodiments, and boundary information that fully meets the requirements of accuracy in usage scenarios, may be obtained by using the new neural network to identify the first image.

In some exemplary embodiments, the new neural network may include a hierarchical convolutional network, an attention-based coding network, a fusion network and an identification network. A training method of the new neural network may include:

S201. Obtain a sample image(s), where the tag(s) of the sample image represents the boundary information of the objects in the sample image.

S202. Obtain first feature information by performing a hierarchical convolution processing on the sample image with the hierarchical convolutional network.

The feature extraction capability of traditional neural network may not be sufficient to mine enough detail information, nor to mine enough recognizable information that meets the requirements of object recognition. Therefore, a hierarchical convolutional network is designed in some exemplary embodiments to enrich the extracted information of the first feature information by extracting sufficient recognizable information layer by layer. The hierarchical convolutional network may include at least two extraction branches. Certainly, the number of the extraction branches is not limited herein, but the greater the number of the extraction branches, the slower the extraction speed, and the better extraction result.

For example, when there are two extraction branches, the hierarchical convolutional network may work as follow:

The first branch performs a feature extraction operation on an input image to obtain a first feature extraction result; the first feature extraction result is then inputted into the second branch after a feature filtration; the second branch performs another feature extraction operation on the first feature extraction result to obtain a second feature extraction result; and fuses the first feature extraction result and the second feature extraction result to mine hidden information, thus a better extraction result may be obtained.

Figure 2:
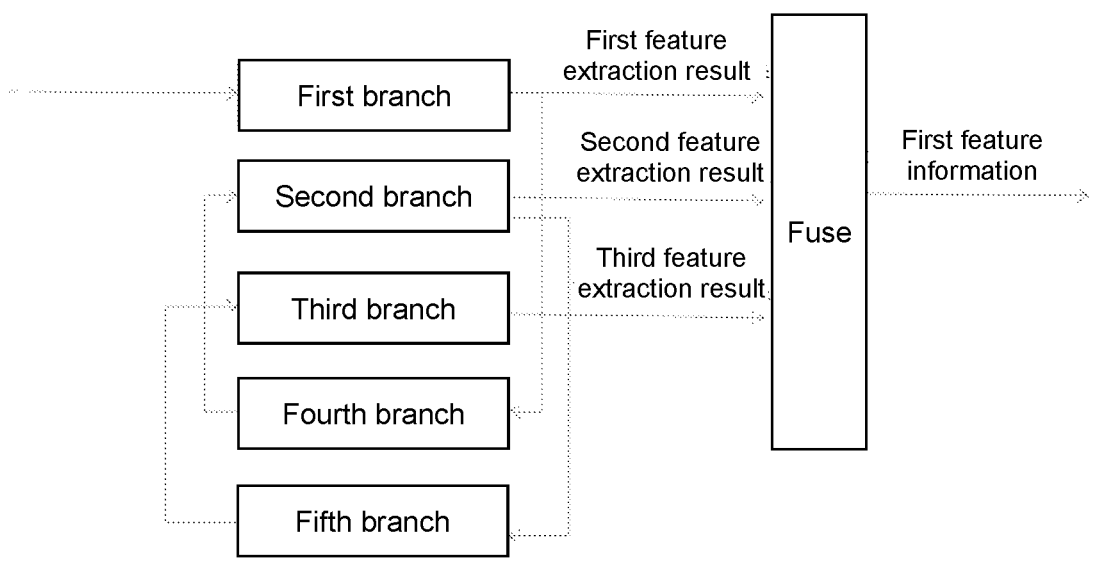
FIG. 2 schematically shows a diagram of a hierarchical convolutional network according to some exemplary embodiments of the present disclosure.

Specially, referring to FIG. 2, which schematically shows a working diagram of a hierarchical convolutional network with three extraction branches. The hierarchical convolutional network includes a first branch, a second branch, and a third branch, all of which are configured to perform feature extraction operation. The feature extraction operation could be convolution operation or multi-scale convolution operation, and is not limited herein.

In addition, the hierarchical convolutional network may further include a fourth branch and a fifth branch, both of which are configured to perform feature filtration operation. The fourth branch is connected to the first branch; the fifth branch is connected to the second branch. In some exemplary embodiments, the feature filtration operation may include an importance judgement operation and an importance-based feature erasure operation.

Taking the fourth branch performing the feature filtration operation as an example, it may work as follow:

(1) performing region division on the first feature extraction result to obtain a number of regions, such as at least nine blocks, where the first feature extraction result is extracted by the first branch and then inputted to the fourth branch;

(2) performing an importance judgement operation on the information corresponding to each region to obtain a first importance degree of each region;

(3) erasing the information in a region(s) where the first importance degree of the region(s) is greater than a pre-set threshold value to obtain a first correction information;

(4) outputting the first correction information to the second branch.

In some exemplary embodiments, in the first feature extraction result, after the importance judgement operation, the information corresponding to a region with a high first importance degree is shown out, and after the importance-based erasure operation performed by the fourth branch, the information corresponding to a region with a lower first importance degree is recorded in the first correction information. The first correction information is then inputted to the second branch, the second branch continues to perform a feature extraction operation on the first correction information to obtain a second feature extraction result, so that the information that is difficult to be extracted may be extracted by the second branch, and hidden information may be minded. Based on this idea, the information that is difficult to be extracted may be mined layer by layer.

Similarly, the second feature extraction result, which is extracted by the second branch, may be inputted into the fifth branch, the fifth branch performs another feature filtration operation (similar to that of the fourth branch) to obtain a second correction information; the second correction information may be inputted to the third branch and the third branch performs another feature extraction operation to obtain a third feature extraction result.

Finally, the first feature extraction result, the second feature extraction result and the third feature extraction result respectively extracted by the first branch, the second branch and the third branch are fused to obtain the first feature information with strong recognition. That is, the information extracted or mined layer by layer may be fused to obtain new information with strong recognition.

S203. Obtain second feature information by performing an attention-based coding process on the sample image based on an attention-based coding network.

The feature extraction capability of traditional neural network may not be sufficient, so a unique hierarchical convolutional network is designed to obtain information with strong recognition (the first feature information). However, the information may not always meet the requirements for the accuracy of object boundary prediction in some exemplary embodiments. The reason is that a convolution operation is used as a core operation for feature extraction by the hierarchical convolutional network, but the convolution operation pays little attention to global information of the sample image, but mainly focuses on local information of the sample image within the convolution sensory field. The lack of global information about the sample image may affect the expressiveness of the first feature information to a certain extent.

To resolve this technical problem, an attention-based coding process on sample images is proposed in some exemplary embodiments. The attention-based coding process may serialize sample images and code the serialized sample images to obtain second feature information. The process of coding the serialized sample images focus on global information of the sample images, so that the second feature information contains sufficient global information.

In the related technologies, each coding point is treated equally in the attention-based coding process. However, such treatment may reduce the convergence speed of the neural network, and may be unreasonable. So, setting weights for each coding point in the attention-based coding process has been provided in some exemplary embodiments. Each weight represents a coding point's importance. In the attention-based coding process, during the process of coding the serialized sample images, attention-based coding processing may be performed on each coding point to obtain the coding information corresponding to that coding point, the information of each coding point may be fused based on the weights to obtain the second feature information. The main purpose of above operation is to improve the convergence speed of the neural network.

In addition, how to set the weight for each coding point may influence the speed of convergence. So, a calculation method for each coding point's weight is provided in some exemplary embodiments. Taking point PA as an example, point PA may be any one of the coding points, and the calculation method may include: calculating a distance between coding information corresponding to other coding points than the coding point PA and the coding information corresponding to the coding point PA; and determining a weight for point PA based on the distance. Setting weights based on distances makes the weights setting more reasonable, and it may further improve the convergence speed.

The specific operation processes for attention-based coding operation and convolution operation will not be described in detail herein, and reference maybe be made to related technologies.

S204. Obtain third feature information by fusing the first feature information and the second feature information based on a fusion network.

The first feature information is with strong recognition and focuses on the local information of the sample image, the second feature information focuses on the global information of the sample image, the third feature information, which is obtained by fusing the first feature information and second information, has all of the above advantages and is a kind of high-quality information.

S205. Obtain boundary prediction information by inputting the third feature information to an identification network.

S206. Train the neural network and optimize parameters of the neural network based on a difference between the boundary prediction information and the tag(s) of the sample image.

In some exemplary embodiments, a loss of the neural network may include two parts, one of which is a first loss based on the difference between the boundary prediction information and the tag(s), and the other part is a second loss due to the importance judgement. That is, the second loss is the loss generated by each branch performing the importance judgement, which is a sum of the losses generated by the fourth and fifth branches in FIG. 2, for example.

Specifically, the loss from the fourth branch, for example, may be determined by the following method:

S301. Erase the information corresponding to each region from the first feature extraction result, and then perform object identifying on the erased results, and determine a second importance degree of the corresponding region based on the difference between the object identification result and the tag(s).

The object identification processing herein may refer to a mature network in related technologies and is not limited herein. Because the object identification processing is only used to determine the relative importance degree of each region other than an absolute importance degree thereof, the accuracy requirement of the object identification processing may not be high, and a mature network may be used. It is easy to understand that, the smaller the difference between the object identification result and the tag(s), the less important the region is.

S302. Obtain an information indicator value corresponding to each region by self-fusing the information in the corresponding region in the first feature extraction result.

A self-fusing algorithm is not limited in herein, and reference may be made to the fusion operations in neural network.

S303. Normalize the second importance degree and the information indicator value corresponding to each region and fuse the normalized results to obtain a second importance reference value corresponding to each region.

S304. Input the first feature extraction result to the fourth branch to obtain a first importance degree corresponding to each region.

S305. Determine a loss generated by the fourth branch based on the difference between the second importance reference value and the first importance degree.

The trained neural network, which is trained based on the first loss and the second loss, may be used to identify every object in the first image so as to obtain the boundary information of every object. On the basis of the horizontal position information of the objects in the first image, an object distribution map of the first image may be obtained. On the basis of the object distribution map of the first image, the first instruction sequence for controlling the first manipulator and the second instruction sequence for controlling the second manipulator may be generated. The method of generating the first instruction sequence and second instruction sequence may include the following steps.

S401. Divide the object distribution map into three regions, a first region Q1, a second region Q2, and a third region Q3. The first region Q1 is where the first manipulator may reach without any collision with the second manipulator; the second region Q2 is where the second manipulator may reach without any collision with the first manipulator; the third region Q3 is where both the first and second manipulators may reach with a potential collision therebetween.

S402. Generate the first instruction sequence and the second instruction sequence based on the object distribution in the first region Q1, the second region Q2, and the third region Q3.

For example, the information of the number and relative positions of objects in each region may be obtained based on the object distribution in each region, and based on the information of the number and relative positions of objects in each region, the operation path of the two manipulators may be planned for the cooperative operation between these two manipulators and reduce the possibility of collision or interference with each other. For example, region allocation and/or crowding reduction for the objects may be used to reduce the possibility of collision or interference.

For example, two different marks (e.g. a synchronous mark and an asynchronous mark) may be used to distinguish a synchronous operation from an asynchronous operation (e.g., alternate operations). When the two manipulators are executing certain instructions and there will be no interference or collision between the two manipulators, the instructions may be marked with the synchronous mark, so that the two manipulators may operate simultaneously. On the other hand, when the two manipulators are executing certain instructions and interference or collision will occur between the two manipulators, the instructions may be marked with the asynchronous mark, so that the two manipulators may operate asynchronously or alternately.

In some exemplary embodiments, based on precise object distribution information, a shorter operation path may be planed for the manipulators. So, an object that is closest (or closer) to the last grasped object may be selected as the next object to be grasped when planning the manipulators' operating path.

Specifically, the generating of the first instruction sequence and the second instruction sequence based on the object distribution in the first region Q1, the second region Q2 and the third region Q3 may further include:

S4021. Obtain a first number of objects in the first region, a second number of objects in the second region, and a third number of objects in the third region.

Figure 3:
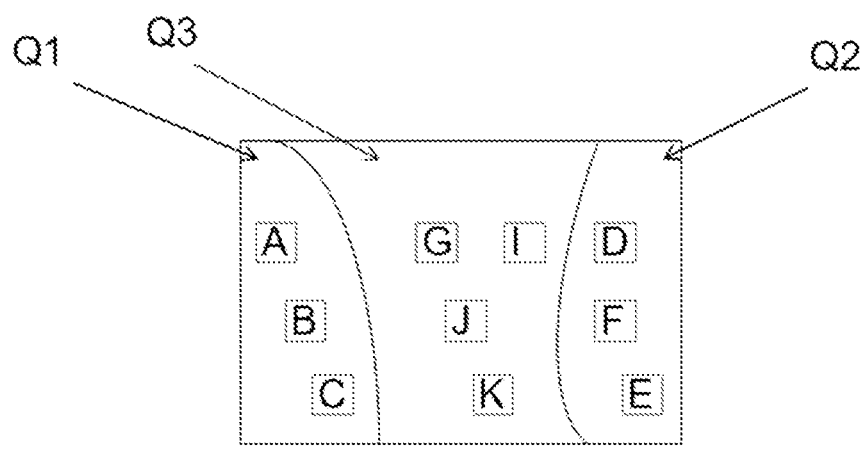
FIG. 3 schematically shows a diagram of region partition according to some exemplary embodiments of the present disclosure.

FIG. 3 schematically shows a diagram of region partition in some exemplary embodiments. There are three objects A, B and C in the first region Q1, three objects D, E and F in the second region Q2, and four objects G, I, J and K in the third region Q3. So the first number, second number and third number are 3, 3 and 4 respectively.

S4022. Generate the first instruction sequence and the second instruction sequence based on the first number, the second number and the third number. The first instruction sequence includes all of the instructions corresponding to the objects in the first region Q1, and the second instruction sequence includes all of the instructions corresponding to the objects in the second region Q2. The instructions corresponding to the objects in the first region Q1 and corresponding to the objects in the second region Q2 are all marked with synchronous marks. At least one of the first and second instruction sequences includes at least one instruction corresponding to the objects in the third region Q3.

The instructions corresponding to the objects in a certain region refers to that the instruction is configured to move the corresponding object to a pre-set position. To be specific, the instruction corresponding to object A is configured to move object A to its pre-set position.

Because the instructions corresponding to the objects in the first region Q1 and corresponding to the objects in the second region Q2 are all marked with synchronous marks, when the first manipulator executes the instructions corresponding to the objects in the first region Q1, the second manipulator may execute the instructions corresponding to the objects in the second region Q2 synchronously.

In order to keep the operation path of a manipulator as short as possible, the objects should be grasped and moved to a designated area in a certain order. The order of movement of objects in different region may be the same or different.

Taking the objects in the first region Q1 as an example, the following exemplary embodiments describe how to generate instructions corresponding to the objects in this region.

1. Select an object closest to a current position of the first manipulator as a current object, and adding its corresponding instruction into the instruction sequence.

Taking FIG. 3 as an example, object A is the closest object to the first manipulator, so object A is selected as the current object and the instruction corresponding to object A is added into the instruction sequence to obtain an instruction sequence {A}. {A} represents the current instruction sequence which only includes one instruction that corresponding to object A.

2. Select an object that is not previously selected and is closest to the current object in the first region Q1 as a new current object, and adding its corresponding instruction into the instruction sequence.

In FIG. 3, object B is the object closest to object A and has not been selected, so object B is selected as a new current object and the instruction corresponding to object B is added into the instruction sequence to obtain an instruction sequence {A, B}. {A, B} represents that the instruction corresponding to object A is at the head of the instruction sequence, and the instruction corresponding to object B is at the tail of the instruction sequence.

3. Repeatedly perform step 2 until all the objects in the first region Q1 has been selected.

In FIG. 3, when all the objects in the first region Q1 have been selected, an instruction sequence {A, B, C} is generated. {A, B, C} represents that, the instruction corresponding to object A is at the head of the instruction sequence, followed by the instruction corresponding to object B, and finally the instruction corresponding to object C.

If the first number is equal to the second number and the third quantity is zero, all the instructions in the first instruction sequence correspond to the objects in the first region Q1, and all the instructions in the second instruction sequence correspond to the objects in the second region.

If the first number is not equal to the second number, in the case where the first number is greater than the second number, for example, methods (a)-(c) as described below may be performed to generate the first instruction sequence and the second instruction sequence. If the first number is less than the second number, the method may be similar.

(a) Calculate a difference δ between the first number and the second number.

Figure 4:
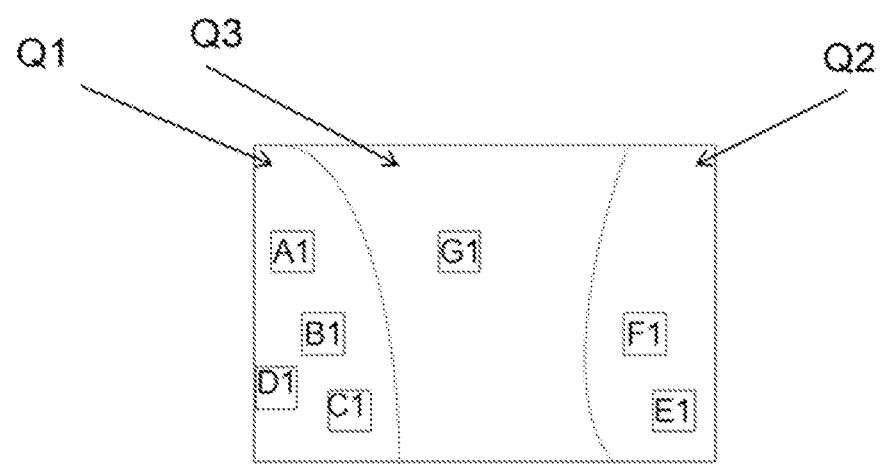
FIG. 4 schematically shows a diagram of region partition according to some exemplary embodiments of the present disclosure.

Taking FIG. 4 as an example, which schematically shows a diagram of region partition. There are four objects A1, B1, C1 and D1 in the first region Q1, two objects E1, F1 in the second region Q2, and one object G1 in the third region Q3. The first number, second number and third number are 4, 2, and 1, respectively. The difference δ between the first number and the second number is 2.

(b) If the third number is less than or equal to the difference δ, sequentially add the instructions corresponding to the objects in the first region Q1 into the first instruction sequence, and sequentially add the instructions corresponding to the objects in the combined region of the second region Q2 and the third region Q3 into the second instruction sequence; and mark the instructions in the first instruction sequence and second sequence with synchronization markers.

In FIG. 4, the instructions corresponding to the four objects in the first region Q1 are added sequentially into the first instruction sequence. The instructions corresponding to the two objects in the second region Q2 and all the objects in the third region Q3 are added sequentially into the second instruction sequence. So, the first instruction sequence becomes {A1. B1. C1. D1}, and the second instruction sequence becomes {E1, F1. G1}.

(c) If the third number is greater than the difference δ, sequentially add the instructions corresponding to the objects in the first region Q1 into the first instruction sequence; sequentially add the instructions corresponding to the objects in the second region Q2 into the second instruction sequence; and sequentially add the instructions corresponding to the objects in the third region Q3 whose number is equal to the difference δ into the second instruction sequence following the instructions corresponding to the objects in the second region Q2, and mark the instructions corresponding to the objects in the first region Q1 and the second region Q2 and the objects corresponding to the third region Q3 whose number is equal to the difference δ with synchronization markers.

In some exemplary embodiments, a sequence SE1 whose instructions corresponding to the objects in the third region Q3 whose number is equal to the difference δ may be generated in the following way.

10. Select an object in the third region Q3 closest to the last selected object in the second region Q2 as a current object, and add the instruction corresponding to the current object at the head of the sequence SE1. The instruction corresponding to the last selected object in the second region Q2 is the last one of the instructions corresponding to the objects in the second region Q2.

20. Randomly select an object in the third region Q3 which has not been previously selected as a new current object, and sequentially add the instruction corresponding to the new current object into the sequence SE1.

30. Repeat step 20 until the number of the selected objects in the third region Q3 is equal to the difference δ.

The above way of how to generate the sequence SE1 shortens the operation path of the manipulators and improves the generation speed.

In some exemplary embodiments, the sequence SE1 whose instructions corresponding to the objects in the third region Q3 whose number is equal to the difference δ may be generated in the following way, which may include:

100. Select an object in the third region Q3 closest to the last selected object in the second region Q2 as a current object, and add the instruction corresponding to the current object at the head of the sequence SE1. The instruction corresponding to the last selected object in the second region Q2 is the last one of the instructions corresponding to the objects in the second region Q2.

200. Select an object with highest crowding and not previously selected in the third region Q3 as a new current object, and sequentially add the instruction corresponding to the new current object into the sequence SE1.

The crowding is an indicator representing the surroundings of an object. If there are other objects around W1, for example, within a range of 1 m from object W1, and there are no objects located within a range of 1 m from object W2, the crowding of object W1 is greater than that of object W2. The crowding of an object can be calculated by the formula $\Sigma 1/\|w-w_e\|$, where w denotes an object to be selected, for example, the current object $w_e$ denotes an object around object w, and $\|w-w_e\|$ denotes the distance between object w and object $w_e$.

300. Repeat step 200 until the number of the selected objects in the third region Q3 is equal to the difference δ.

The above method of how to generate the sequence SE1 increases the chance of synchronized operation of different manipulators with a higher probability, because this method may minimize the crowding around the objects in the third region Q3, and the reduced crowding facilitates synchronized operation.

Figure 5:
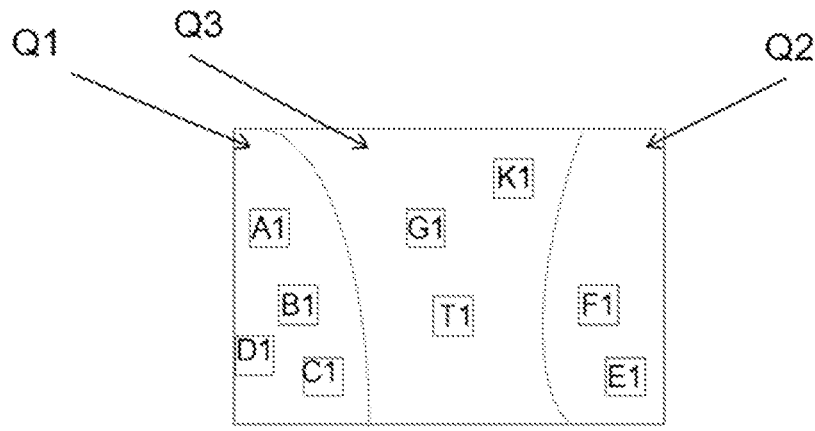
FIG. 5 schematically shows a diagram of region according to some exemplary embodiments of the present disclosure.

Taking FIG. 5 as an example, which schematically shows a diagram of region partition. There are four objects A1, B1, C1 and D1 in the first region Q1, two objects E1, F1 in the second region Q2, and three objects K1, G1, T1 in the third region Q3. The first number, second number and third number are 4, 2, and 3, respectively. The difference δ between the first number and the second number is 2.

In FIG. 5, the instructions corresponding to the four objects in the first region Q1 are sequentially added into the first instruction sequence, i.e., a sequence {A1, B1, C1, D1} is obtained; the instructions corresponding to the two objects in the second region Q2 are sequentially added into the second instruction sequence, i.e., a sequence {E1, F1} is obtained; and the instructions corresponding to the two objects in the third region Q3 are sequentially added into the second instruction sequence following the instructions corresponding to the objects in the second region Q2, i.e., a sequence {E1, F1, G1, T1} is obtained.

The instructions in the first instruction sequence and second instruction sequence generated by steps (a)~(c) carry synchronization markers, so the objects corresponding those instructions can be grasped and moved simultaneously, thereby enhancing the work efficiency. In some exemplary embodiments, when the instructions in the first instruction sequence and second instruction sequence are generated through step 1~3, the operation path of the manipulators may be shortened, thus, the work efficiency is further enhanced.

If a first pre-set condition is met, the following operations may be performed to generate the first sequence and second sequence:

Execute a first algorithm, which is configured to add the instruction corresponding to a first object in the third region Q3 at the tail of the first instruction sequence, add the instruction corresponding to a second object in the third region Q3 at the tail of the second instruction sequence, and mark the instructions corresponding to the first object and the second object with synchronization markers.

Repeat the first algorithm until a first ending condition is met.

The first pre-set condition, for example, may include two cases: one is that the first number is equal to the second number, and the third number is not equal to zero; the other is that the first number is not equal to the second number, but there is still unselected object(s) in the third region Q3 after the execution of steps (a)~(c).

The first ending condition, for example, may also include two cases: one is that there is no unselected object in the third region Q3 (no first object to be selected); the other is that no second object can be selected after selecting the first object.

In some exemplary embodiments, the specific execution process of the first algorithm may include the following steps:

(a1) Among the unselected objects in the third region Q3, select an object that is closest to the object corresponding to the last instruction in the first instruction sequence as the first object; select an object that is outside an interference area of the first object but has the highest crowding as the second object, where an object, object W1 for example, is "outside the interference area of the first object" indicates that when the first manipulator grasps the first object and the second manipulator grasps object W1 simultaneously, the first manipulator and the second manipulator do not collide.

(b1) Add the instruction corresponding to the first object at the tail of the first instruction sequence, and add the instruction corresponding to the second object at the tail of the second instruction sequence. In some exemplary embodiments, mark the instructions corresponding to the first object and second object with synchronous markers.

(c1) Repeat steps (a1)~(b1) until the first ending condition is met.

The above execution process of the first algorithm by executing steps (a1)~(c1) minimizes the operation path of the first manipulator and facilitates synchronous operation by reducing the degree of crowding.

In some exemplary embodiments, the specific execution process of the first algorithm may include the following steps:

(a10) Among the unselected objects in the third region Q3, select an object that is closest to the object corresponding to the last instruction in the first instruction sequence as the first object, and select an object that is outside an interference area of the first object and closest to the object corresponding to the last instruction in the second instruction sequence as the second object.

(b10) Add the instruction corresponding to the first object at the tail of the first instruction sequence, and add the instruction corresponding to the second object at the tail of the second instruction sequence. In some exemplary embodiments, mark the instructions corresponding to the first object and second object with synchronous markers.

(c10) Repeat steps (a10)~(b10) until the first ending condition is met.

The above execution process of the first algorithm by executing steps (a10)~(c10) minimizes the operation path of the first manipulator and the second manipulator.

When the first ending condition is met and there is no unselected object in the third region Q3, the generation of the first instruction sequence and the second instruction sequence is done.

When the first ending condition is met, but there is still an unselected object(s) in the third region Q3, for example, the unselected objects are within the interference area of the current first object, so no second object can be selected. In this case, the following operations may be further performed to generate the first instruction sequence and the second instruction sequence.

Execute a second algorithm, which is configured to select a third object among the objects to be selected in the third region Q3, and add the instruction corresponding to the third object at the tail of the first instruction sequence; select a fourth object among the objects to be selected in the third region Q3 if there is still an unselected object(s), and add the instruction corresponding to the fourth object at the tail of the second instruction sequence; and mark the instructions corresponding to the third object and fourth object with asynchronous markers.

Repeat the second algorithm until a second ending condition is met.

Instructions with asynchronous markers indicate that the instructions cannot be executed synchronously.

On the one hand, instructions with asynchronous markers may be executed at different time points, that is, there is a certain time difference when start to execute the instructions with asynchronous markers. For example, when the first manipulator executes the instruction corresponding to the third object in the third region Q3, the second manipulator does not move to the third region Q3 to execute the instruction corresponding to the fourth object until the first manipulator is ready to leave (or the first manipulator has grasped an object and is ready to lift).

On the other hand, instructions with asynchronous markers may also be executed alternately, or instructions with asynchronous markers may be understood as exclusive instructions. For example, the second manipulator may not execute instructions until the first manipulator finishes the execution of an instruction with an asynchronous marker; after the first manipulator finishes the execution of the instruction with an asynchronous marker, the second manipulator may execute instructions and the first manipulator may not execute instructions.

The second ending condition may include two cases: one is that there is no third object can be selected; the other is that there is no fourth object can be selected.

In some exemplary embodiments, the specific execution process of the second algorithm may include the following steps:

(a100) Among the unselected objects in the third region Q3, select an object which is closest to the object corresponding to the last instruction in the first instruction sequence as a third object, and add the instruction corresponding to the third object at the tail of the first instruction sequence, and mark the instruction corresponding to the third object with an asynchronous marker(s).

(b100) Among the unselected objects in the third region Q3, select an object which is closest to the object corresponding to the last instruction in the second instruction sequence as a fourth object, and add the instruction corresponding to the fourth object at the tail of the second instruction sequence, and mark the instruction corresponding to the fourth object with an asynchronous marker(s).

(c100) Repeat steps (a100)~(b100) until the second ending condition is met.

The above execution process of the second algorithm by executing steps (a100)~(c100) may minimize the operation path of the first manipulator and second manipulator.

S102. Control the first manipulator and the second manipulator based on the first instruction sequence and the second instruction sequence.

Figure 6:
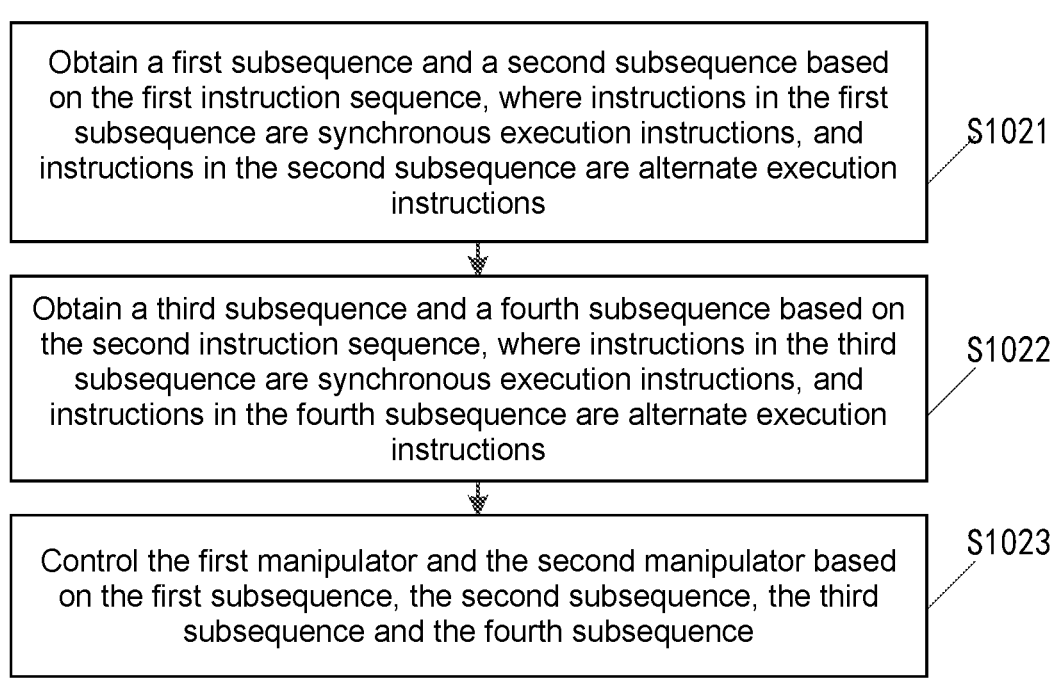
FIG. 6 schematically shows a flowchart of a dual-manipulator control method according to an instruction sequence(s) according to some exemplary embodiments of the present disclosure.

As shown in FIG. 6, the controlling of the first manipulator and the second manipulator based on the first instruction sequence and the second instruction sequence may include:

S1021. Obtain a first subsequence and a second subsequence based on the first instruction sequence, where instructions in the first subsequence are synchronous execution instructions, and instructions in the second subsequence are asynchronous execution instructions, such as alternate execution instructions.

S1022. Obtain a third subsequence and a fourth subsequence based on the second instruction sequence, where instructions in the third subsequence are synchronous execution instructions, and instructions in the fourth subsequence are asynchronous execution instructions, such as alternate execution instructions.

Synchronous execution instructions refer to those instructions with synchronous markers, and asynchronous execution instructions refer to those instructions with asynchronous markers. Alternate execution instructions refer to those exclusive instructions. For example, the second manipulator does not execute instructions when the first manipulator executes an alternate execution instruction; after the first manipulator completes the corresponding alternate execution, the second manipulator may execute instructions and the first manipulator does not execute instructions.

The synchronous execution instructions in the first instruction sequence are sequentially extracted to obtain a first subsequence; the asynchronous execution instructions in the first instruction sequence are sequentially extracted to obtain a second subsequence; the synchronous execution instructions in the second instruction sequence are sequentially extracted to obtain a third subsequence; the asynchronous execution instructions in the second instruction sequence are sequentially extracted to obtain a fourth subsequence.

Based on the methods aforementioned, when there are asynchronous execution instructions, the number of the instructions in the first subsequence and third subsequence are the same; when there are no asynchronous execution instructions, the second subsequence and the fourth subsequence are null.

S1023. Control the first manipulator and the second manipulator based on the first subsequence, the second subsequence, the third subsequence and the fourth subsequence.

Specifically, a first instruction located at head of the first subsequence and a third instruction located at the head of the third subsequence may be ejected/extracted synchronously; the "eject/extract" herein refers to obtain (an instruction) and delete (this instruction) from its original location. Ejecting/extracting a first instruction located at the head of the first subsequence refers to that a first instruction located at the head of the first subsequence is obtained and the obtained first instruction is then deleted from the first subsequence.

The first instruction is sent to the first manipulator to execute a first action and the third instruction is sent to the second manipulator synchronously to execute a third action.

A new first instruction located at the head of the first subsequence and a new third instruction located at the head of the third subsequence are ejected/extracted repeatedly in response to the situation that the first manipulator completes the first action, and the second manipulator completes the third action.

The first instruction herein is an instruction that locates at the head of the first subsequence, the first action is an action corresponding to the first instruction; the third instruction is an instruction that locates at the head of the third subsequence, and the third action is an action corresponding to the third instruction.

In response to the situation that the first subsequence and the third subsequence are null, and the second subsequence and the fourth subsequence are null, the process of controlling the first manipulator and the second manipulator ends.

In response to the situation that the first subsequence and the third subsequence are null, but the second subsequence is not null, a second instruction located at the head of the second subsequence may be ejected/extracted and the second instruction may be then sent to the first manipulator to execute a second action.

In response to the situation that the second action is completed and the fourth subsequence is null, the process of controlling the first manipulator and the second manipulator ends.

In response to the situation that the second action is completed and the fourth subsequence is not null, a fourth instruction located at the head of the fourth subsequence may be ejected/extracted and the fourth instruction may be then sent to the second manipulator to execute a fourth action.

The second instruction is an instruction located at the head of the second subsequence, the second action is an action corresponding to the second instruction; the fourth instruction is an instruction located at the head of the fourth subsequence and the fourth action is an action corresponding to the fourth instruction.

In response to the situation that the fourth action is completed by the second manipulator and the remaining second subsequence is not null, a new second instruction located at the head of the second subsequence may be ejected/extracted and this new second instruction may be sent to the first manipulator to execute a new second action.

In response to the situation that the fourth action is completed by the second manipulator and the remaining second subsequence is null, but the fourth subsequence is not null, a new fourth instruction located at the head of the fourth subsequence may be ejected/extracted and this new fourth instruction may be sent to the second manipulator to execute a new fourth action.

The dual-manipulator control method described herein may allow the two manipulators to cooperate for grasping and moving objects. Compared to a single manipulator, the work efficiency can be substantially increased.

In the present disclosure, a central control module is also provided. The central control module may be configured to be used in a dual-manipulator system. The dual-manipulator system may include:

A central control module, which is configured to execute a dual-manipulator control method; a first manipulator and a second manipulator, both are configured to be controlled by the central control module.

The central control module may include:

An instruction generation unit, which is configured to generate a first instruction sequence and a second instruction sequence. The instructions in the first instruction sequence are configured to control the first manipulator and the instructions in the second instruction sequence are configured to control the second manipulator.

A control unit, which is configured to control the first manipulator and the second manipulator based on the first instruction sequence and the second instruction sequence.

In the present disclosure, a manipulator is also provided. The manipulator may be configured to receive target instructions sent by a central control module. The central control module is configured to execute the dual-manipulator control method described herein; the target instructions are instructions in the first instruction sequence and/or the second instruction sequence.

In the present disclosure, a dual-manipulator system is further provided. The dual-manipulator system includes a first manipulator, a second manipulator and a central control module; the first and second manipulators are controlled by the central control module and the central control module is configured to execute the dual-manipulator control method described herein.

In the present disclosure, a computer-readable storage medium may be further provided, which may be a non-transitory computer-readable storage medium. The non-transitory computer-readable storage medium has at least one instruction sequence or at least one program stored therein, the at least one instruction sequence or at least one program may be loaded by a processor and configured to execute the dual-manipulator control method described above. The computer readable storage medium may be a non-volatile computer readable storage medium.

Some exemplary embodiments of the present disclosure have been described above, and the above description is exemplary. The present disclosure is not limited to the disclosed exemplary embodiments. Many modifications and changes without departing from the scope and spirit of the illustrated exemplary embodiments are apparent to those of ordinary skill in the art. The terminology used herein is chosen to best explain the principles of the embodiments, the practical application or technical improvement over technologies found in the marketplace, or to enable others of ordinary skill in the art to understand the exemplary embodiments disclosed herein.

What is claimed is:

1. A dual-manipulator control method for a dual-manipulator system, comprising:
   generating, by a central control module of the dual-manipulator system, a first instruction sequence including at least one instruction to control a first manipulator of the dual-manipulator system;
   generating, by the central control module, a second instruction sequence including at least one instruction to control a second manipulator of the dual-manipulator system; and
   controlling, by the central control module, the first manipulator and the second manipulator based on the first instruction sequence and the second instruction sequence, wherein the first instruction sequence and the second instruction sequence are generated by:
      obtaining a first image by an image capturing apparatus of the system,
      identifying an object in the first image, and obtaining horizontal position information and vertical position information of the object, and
      generating the first instruction sequence and the second instruction sequence based on the horizontal position information and vertical position information of the object.

2. The method of claim 1, wherein the controlling of the first manipulator and the second manipulator based on the first instruction sequence and the second instruction sequence includes:
   obtaining, by the central control module, a first subsequence and a second subsequence based on the first instruction sequence;
   obtaining, by the central control module, a third subsequence and a fourth subsequence based on the second instruction sequence; and
   controlling, by the central control module, the first manipulator and the second manipulator based on the first subsequence, the second subsequence, the third subsequence and the fourth subsequence, wherein
   instructions in the first subsequence and the third subsequence are synchronous execution instructions, and
   instructions in the second subsequence and the fourth subsequence are asynchronous execution instructions.

3. The method of claim 2, wherein the controlling of the first manipulator and the second manipulator based on the first subsequence, the second subsequence, the third subsequence and the fourth subsequence includes:
   synchronously extracting a first instruction located at a head of the first subsequence and a third instruction located at a head of the third subsequence;
   synchronously sending the first instruction to the first manipulator to execute a first action and the third instruction to the second manipulator to execute a third action; and
   repeatedly extracting a new first instruction located at the head of the first subsequence and a new third instruction located at the head of the third subsequence upon the first manipulator completing the first action and the second manipulator completing the third action.

4. The method of claim 3, wherein the controlling of the first manipulator and the second manipulator based on the first subsequence, the second subsequence, the third subsequence and the fourth subsequence further includes:
   controlling the first manipulator and the second manipulator based on the second subsequence and the fourth subsequence upon determining that the first subsequence and the third subsequence are null.

5. The method of claim 4, wherein the controlling of the first manipulator and the second manipulator based on the second subsequence and the fourth subsequence includes:
   extracting a second instruction located at a head of the second subsequence and sending the second instruction to the first manipulator to execute a second action; and
   extracting a fourth instruction located at a head of the fourth subsequence and sending the fourth instruction to the second manipulator to execute a fourth action following the first manipulator completing the second action.

6. The method of claim 5, wherein the controlling of the first manipulator and the second manipulator based on the second subsequence and the fourth subsequence further includes:
   extracting a new second instruction located at the head of the second subsequence and sending the new second instruction to the first manipulator to execute a new second action upon determining that the second manipulator completes the fourth action and the second subsequence resulting from extracting the new second instruction is not null.

7. The method of claim 5, wherein the controlling of the first manipulator and the second manipulator based on the second subsequence and the fourth subsequence further includes:
   extracting a new fourth instruction located at the head of the fourth subsequence and sending the new fourth instruction to the second manipulator to execute a new fourth action, upon determining that the second manipulator completes the fourth action and the fourth subsequence resulting from extracting the new fourth instruction is null.

8. The method of claim 2, wherein the obtaining of the first subsequence and the second subsequence based on the first instruction sequence includes:
   extracting each instruction with a synchronization mark from the first sequence in sequence to form the first subsequence; and
   extracting each instruction with an asynchronization mark from the first sequence in sequence to form the second subsequence.

9. The method of claim 2, wherein the obtaining of the third subsequence and the fourth subsequence based on the second instruction sequence includes:
   extracting each instruction with a synchronization mark from the second sequence in sequence to form the third subsequence; and
   extracting each instruction with an asynchronization mark from the second sequence in sequence to form the fourth subsequence.

10. A dual-manipulator control system, comprising:
    a first manipulator;
    a second manipulator; and
    a central control module, configured to:
    generate a first instruction sequence including at least one instruction to control the first manipulator,
    generate a second instruction sequence including at least one instruction to control the second manipulator, and
    control the first manipulator and the second manipulator based on the first instruction sequence and the second instruction sequence, wherein the first instruction sequence and the second instruction sequence are generated by:
       obtaining a first image by an image capturing apparatus of the system, identifying an object in the first image, and obtaining horizontal position information and vertical position information of the object, and generating the first instruction sequence and the second instruction sequence based on the horizontal position information and vertical position information of the object.

11. The dual-manipulator control system of claim 10, wherein to control the first manipulator and the second manipulator based on the first instruction sequence and the second instruction sequence, the central control module is further configured to:

obtain a first subsequence and a second subsequence based on the first instruction sequence;

obtain a third subsequence and a fourth subsequence based on the second instruction sequence; and control the first manipulator and the second manipulator based on the first subsequence, the second subsequence, the third subsequence and the fourth subsequence, wherein instructions in the first subsequence and the third subsequence are synchronous execution instructions, and instructions in the second subsequence and the fourth subsequence are asynchronous execution instructions.

12. The dual-manipulator control system of claim 11, wherein to control the first manipulator and the second manipulator based on the first subsequence, the second subsequence, the third subsequence and the fourth subsequence, the central control module is further configured to:

synchronously extract a first instruction located at a head of the first subsequence and a third instruction located at a head of the third subsequence;

synchronously send the first instruction to the first manipulator to execute a first action and the third instruction to the second manipulator to execute a third action; and repeatedly extract a new first instruction located at the head of the first subsequence and a new third instruction located at the head of the third subsequence upon the first manipulator completing the first action and the second manipulator completing the third action.

13. The dual-manipulator control system of claim 12, wherein to control the first manipulator and the second manipulator based on the first subsequence, the second subsequence, the third subsequence and the fourth subsequence, the central control module is further configured to:

control the first manipulator and the second manipulator based on the second subsequence and the fourth subsequence upon determining that the first subsequence and the third subsequence are null.

14. The dual-manipulator control system of claim 13, wherein to control the first manipulator and the second manipulator based on the second subsequence and the fourth subsequence, the central control module is further configured to:

extract a second instruction located at a head of the second subsequence and sending the second instruction to the first manipulator to execute a second action; and extract a fourth instruction located at a head of the fourth subsequence and sending the fourth instruction to the second manipulator to execute a fourth action following the first manipulator completing the second action.

15. The dual-manipulator control system of claim 14, wherein to control the first manipulator and the second manipulator based on the second subsequence and the fourth subsequence, the central control module is configured to:

extract a new second instruction located at the head of the second subsequence and send the new second instruction to the first manipulator to execute a new second action upon determining that the second manipulator completes the fourth action and the second subsequence resulting from extracting the new second instruction is not null.

16. The dual-manipulator control system of claim 14, wherein to control the first manipulator and the second manipulator based on the second subsequence and the fourth subsequence, the central control module is configured to:

extract a new fourth instruction located at the head of the fourth subsequence and send the new fourth instruction to the second manipulator to execute a new fourth action, upon determining that the second manipulator completes the fourth action and the fourth subsequence resulting from extracting the new fourth instruction is null.

17. The dual-manipulator control system of claim 11, wherein to obtain the first subsequence and the second subsequence based on the first instruction sequence, the central control module is configured to:

extract each instruction with a synchronization mark from the first sequence in sequence to form the first subsequence; and extract each instruction with an asynchronization mark from the first sequence in sequence to form the second subsequence.

18. The dual-manipulator control system of claim 11, wherein to obtain the third subsequence and the fourth subsequence based on the second instruction sequence, the central control module is configured to:

extract each instruction with a synchronization mark from the second sequence in sequence to form the third subsequence; and extract each instruction with an asynchronization mark from the second sequence in turn to acquire the fourth subsequence.

19. A non-transitory computer-readable storage medium, comprising a set of instructions for dual-manipulator control, wherein when executed by at least one processor, the set of instruction directs the at least one processor to perform:

generating a first instruction sequence including at least one instruction to control a first manipulator, generating a second instruction sequence including at least one instruction to control a second manipulator, and controlling the first manipulator and the second manipulator based on the first instruction sequence and the second instruction sequence, wherein the first instruction sequence and the second instruction sequence are generated by:

obtaining a first image by an image capturing apparatus of the system, identifying an object in the first image, and obtaining horizontal position information and vertical position information of the object, and generating the first instruction sequence and the second instruction sequence based on the horizontal position information and vertical position information of the object.

20. The non-transitory computer-readable storage medium of claim 19, wherein the controlling of the first manipulator and the second manipulator based on the first instruction sequence and the second instruction sequence includes:

obtaining a first subsequence and a second subsequence based on the first instruction sequence;
obtaining a third subsequence and a fourth subsequence based on the second instruction sequence; and
controlling the first manipulator and the second manipulator based on the first subsequence, the second subsequence, the third subsequence and the fourth subsequence, wherein
instructions in the first subsequence and the third subsequence are synchronous execution instructions, and
instructions in the second subsequence and the fourth subsequence are asynchronous execution instructions.

\* \* \* \* \*